UNITED STATES PATENT OFFICE.

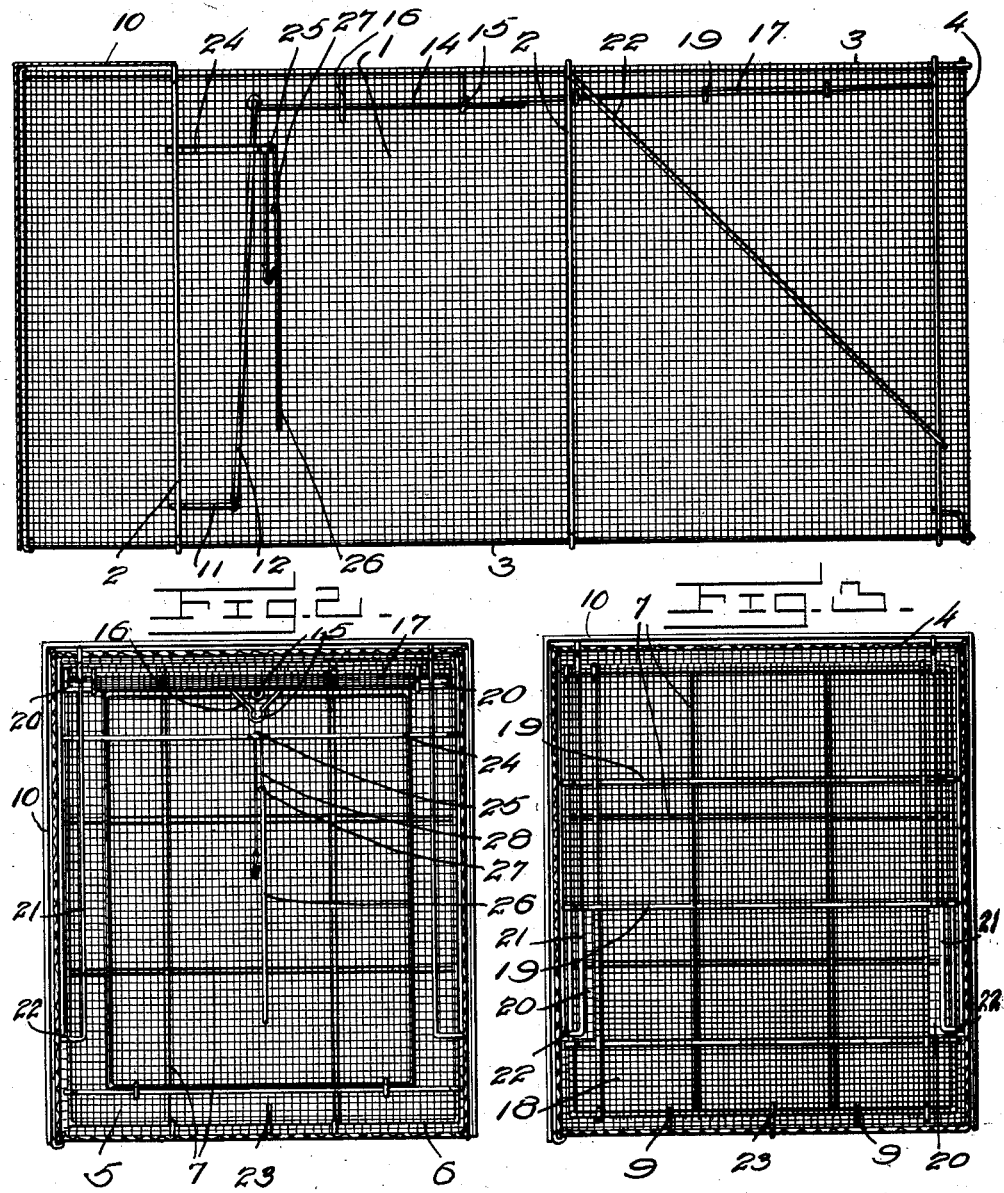

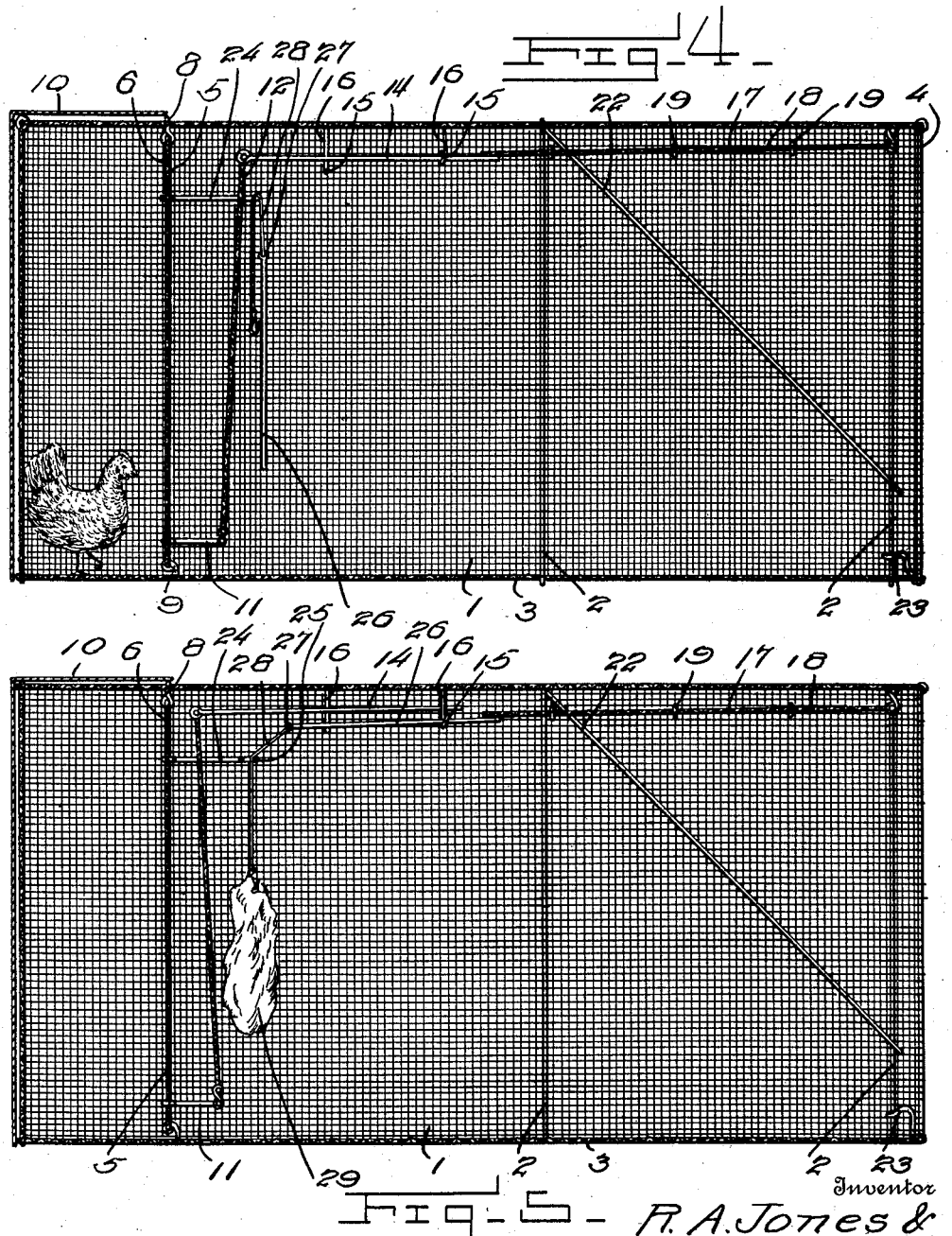

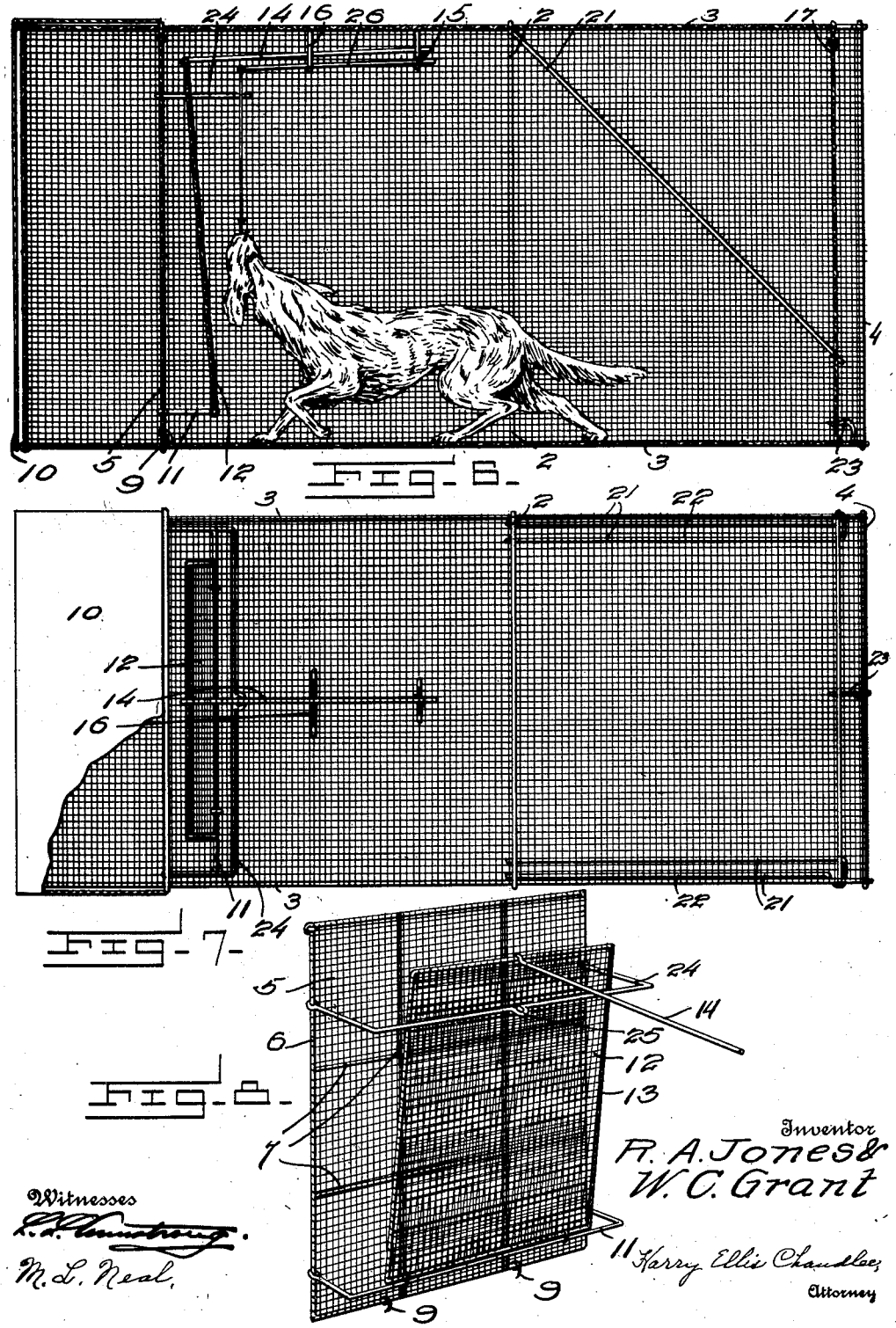

RUFUS A. JONES AND WILBURN C. GRANT, OF ABILENE, TEXAS; SAID GRANT ASSIGNOR OF ONE-HALF HIS RIGHT TO SAID JONES.

TRAP.

1,010,373.

Specification of Letters Patent.

Patented Nov. 28, 1911.

Application filed March 3, 1911. Serial No. 612,135.

*To all whom it may concern:*

Be it known that we, RUFUS A. JONES and WILBURN C. GRANT, citizens of the United States, residing at Abilene, in the county of Taylor and State of Texas, have invented certain new and useful Improvements in Traps, of which the following is a specification.

Our invention relates to improvements in traps and has particular reference to an improved form of trap which will serve to catch the animal alive and retain the same in unharmed condition.

A further object of the invention is the provision of an improved form of trap which will catch an animal in a live and uninjured condition, and in which the struggles made by the animal in attempting to escape will only serve to more securely fasten the closure for the entrance opening of the trap.

Other objects and advantages of our invention will be readily understood from the following description taken in connection with the accompanying drawings, and it will further be understood that we may make any changes or modifications in our trap lying within the scope of the claim without departing from or exceeding the spirit of the invention.

Figure 1 represents a side elevation of our trap. Fig. 2 represents a front view thereof with the door in upwardly swung position. Fig. 3 represents a similar view with the door closed. Fig. 4 represents a longitudinal sectional view of our trap showing one of our improved triggers used to hold the door in elevated position. Fig. 5 is a similar sectional view showing the position of the other trigger when set to hold the door open. Fig. 6 represents a similar longitudinal sectional view with the door closed. Fig. 7 represents a top plan view of the trap partly in section, and Fig. 8 represents a view of the bait protecting partition and the attached trigger actuating door.

In the drawings, the numeral 1 designates the wire mesh from which our trap is formed, the size and strength of said mesh depending upon the animal expected to be caught by our trap, and it will be understood that the same construction of trap differing only in size is adapted for use in catching either weasels or other small animals or for trapping larger animals such as wolves.

Forming a support for the wire mesh 1 are the plurality of circumferentially extending wire bands 2, while connecting the said bands and extending longitudinally of the trap are the stay rods or wires 3, the ends of said stay members being secured to the end band 4 at the entrance of the trap.

From the foregoing description it will be seen that we have provided an improved trap formed from wire mesh suitably braced, while when live bait is to be used in connection with this trap we secure inside the rectangular receptacle formed by the wire mesh the partition 5 having the circumferential brace 6 and the intersecting cross braces 7 for reinforcing the same, one side of the member 6 being hingedly secured to the side of the trap by the link members 8, while the hook latches 9 serve to prevent the rearward swinging of the partition although permitting of the forward movement of said partition to insert the bait. To prevent the animal from attempting to gain access to the trap at the rear thereof, where the live bait is located, we surround said end of the trap with the metal casing 10 which thus prevents the animal from gaining sight of the bait until he has moved to the forward or open end of the trap.

When live bait is employed in our trap we secure to the lower portion of the dividing partition the U-shaped rod 11 upon which is pivotally mounted the supplemental partition 12 having the frame 13 to which the mesh 12 is secured. Attached to the upper edge of the frame 13 is the latch rod 14 which extends forward through the eyes 15 of the brackets 16 which depend from the top of the trap.

Hinged to the roof of the trap at the forward end thereof is the frame 17 covered by the mesh 18 and braced by the intersecting members 19 which are woven through the wire mesh to become an integral part of the door to more satisfactorily strengthen the same. Formed in each side of the door is a vertically extending slot 20 having the frame member 17 forming one side thereof and certain of the brace members disposed at the inner side, while engaged in said slot is one arm 21 of the U-shaped combined brace and door guide 22, said member having its upper ends secured to one of the circumferential brace members of the trap at the roof thereof and extending downward at an angle and having its doubled lower portion passing around another of said bracing members, and having one of its arms lying along the side of the trap and the other passing through the slot in the door, whereby when the door is closed its frame will rest against the bend at the lower end of the brace member which will absolutely prevent the outward movement of the door unless said members either break or are torn loose. To further prevent the outward movement of the door we form the end of one of the longitudinal brace members into a loop passing around the front brace member of the trap and extending rearwardly in a hook 23 which engages the bottom of the door, as is clearly shown in the drawings.

The operation of our trap will be readily understood, and it will be seen that when the animal rushes into the trap to reach the live bait he will impinge against the member 12 and force it to swing rearwardly also moving rearwardly the rod 14 which when in forward position supports the door near the roof of the trap. As the support of this rod is withdrawn the door will fall, thus imprisoning the animal within the trap. Extending across from one side to the other of the trap near its roof is the brace 24 having the eye 25 formed in the center thereof, said brace being slightly forward of the rod 11 and serving to limit the forward swinging of the member 12. When we wish to employ dead bait for our trap, we swing the rod 14 upward to be engaged by the bracket 16 above its eye and we move the rod 26 to be disposed in the eyes 15 of said brackets 16, while secured in the eye 27 of the rod 26 is the flexible connection 28 which passes through the eye 25 and depends into the trap, the dead bait 29 being secured to the lower ends of the connection. When the animal enters the trap and nibbles the bait, it, through the cord 28 draws the rod 26 rearwardly to release the door and allow it to fall in the same manner as heretofore described.

We claim:

A trap, including an inclosing frame, a door pivoted to the upper edge of one end of the frame for closing the said end of the trap, a partition mounted in the frame near the other end thereof, a bracket projecting forward from the lower portion of the partition, a supplemental partition pivoted to and rising from the said bracket, a U-shaped bracket secured to the main partition and spanning the supplemental partition to limit the pivotal movement thereof, a rod secured to the upper end of the supplemental partition and adapted to engage the door to normally hold the same open, guides for said rod depending from the top of the frame, a supplemental rod adapted to take the place of the rod carried by the supplemental partition, and a flexible connection leading from the supplemental rod, the U-shaped bracket having a central eye formed therein through which said flexible connection passes, whereby the said U-shaped bracket forms both a limit for the pivotal movement of the supplemental partition and also as a guide for the flexible connections of the supplemental controlling rod.

In testimony whereof we affix our signatures, in presence of two witnesses.

RUFUS A. JONES.
WILBURN C. GRANT.

Witnesses:
  JOHN SAYLES,
  SETH SAYLES.

Copies of this patent may be obtained for five cents each, by addressing the "Commissioner of Patents, Washington, D. C."